United States Patent [19]
Fischer et al.

[11] Patent Number: 5,664,920
[45] Date of Patent: Sep. 9, 1997

[54] FIXING ELEMENT WITH EXPANDER MEMBER

[75] Inventors: Artur Fischer; Gerhard Porlein, both of Waldachtal; Eberhard Maeder, Eutingen-Goettelfingen, all of Germany

[73] Assignee: Fischerwerke, Artur Fischer GmbH & Co. AG, Waldachtal, Germany

[21] Appl. No.: 631,997

[22] Filed: Apr. 15, 1996

[30] Foreign Application Priority Data

| Apr. 15, 1995 | [DE] | Germany | 195 14159.8 |
| May 26, 1995 | [DE] | Germany | 195 19350.4 |
| Oct. 2, 1995 | [DE] | Germany | 195 36786.3 |

[51] Int. Cl.⁶ ............................. F16B 13/04
[52] U.S. Cl. ............................ 411/79; 411/80
[58] Field of Search .................. 411/76, 78, 79, 411/80, 64, 65

[56] References Cited

U.S. PATENT DOCUMENTS

| 922,980 | 5/1909 | Vernon . |
| 4,275,537 | 6/1981 | Herb et al. ............ 411/79 X |
| 4,813,832 | 3/1989 | Gerhard . |
| 5,562,376 | 10/1996 | Fischer .................. 411/79 |

FOREIGN PATENT DOCUMENTS

| 2533223 | 7/1975 | Germany . |
| 2829158 | 7/1978 | Germany . |
| 2914739 | 4/1979 | Germany . |
| 3125457 | 6/1981 | Germany . |
| 3212269 | 4/1982 | Germany . |
| 3216115 | 4/1982 | Germany . |
| 3334754 | 9/1983 | Germany . |
| 3345696 | 12/1983 | Germany . |
| 175127 | 2/1922 | United Kingdom . |
| 1321479 | 6/1973 | United Kingdom . |

*Primary Examiner*—Neill R. Wilson
*Attorney, Agent, or Firm*—Michael J. Striker

[57] ABSTRACT

A fixing element has an expansion zone formed by a longitudinal slot having a trapezoidal cross-section and produced by stamping, and an expander member inserted in the longitudinal slot and displaceable therein. On the two sliding surfaces of the longitudinal slot arranged at an angle to one another the expander member rests with its two bearing surfaces, likewise arranged at an angle to one another. The external surface of the expander member provided with teeth of roof-shaped construction projects beyond the shank of the fixing element at least with a part of the height of the teeth. The expander member lying in the longitudinal slot so that it is easily displaceable allows subsequent expansion of the anchored fixing element in the event that the drilled hole widens as a result of cracks forming.

14 Claims, 3 Drawing Sheets

FIXING ELEMENT WITH EXPANDER MEMBER

BACKGROUND OF THE INVENTION

The invention relates to a fixing element provided with an expander member and having retaining means arranged at its rear end for clamping an article.

German patent document DE-OS 29 14 739 discloses a fixing element which in the region of its leading end face has an expansion zone which is formed by a longitudinal slot having a base which slopes up towards the leading end and an expander member inserted in the longitudinal slot. Anchoring of such fixing element is effected such that, after driving the shank into a hole pre-drilled in a building component, as the article to be fixed is being clamped to the building component the shank is displaced axially with respect to the expander member which digs into wall of the drilled hole. By virtue of the fact hat the base of the longitudinal slot receiving the expander member slopes upwards, the expander member is pressed radially outward and the fixing element is consequently wedged in the drilled hole. The disadvantage of the known fixing element, however, is that the expander member has teeth on its external surface which form straight edges projecting beyond the shank transversely to the longitudinal direction. These edges taking up the entire width of the expander member present a high resistance as the fixing element is being driven into the building component. In particular in the case of a building component consisting of concrete, in addition to the high resistance to driving which is not conducive to easy assembly, this resistance can result in damage to the fixing element which impairs the anchoring function. Moreover, the expander member scrapes material from the inner wall of the drilled hole during the driving-in operation. That material collects in the longitudinal slot and may possibly lead to the expander member's becoming hammed in the longitudinal slot. This causes the displaceability of the expander member in the longitudinal slot to be impaired to such an extent that subsequent expansion after the anchoring operation, in the event that the drilled hole widens as a result of cracks forming, is not possible. Because of this drawback, the known fixing element is not suitable for use in the tensile zone, in which cracks occur. A further reason why it is unsuitable for the tensile zone and why it has relatively low holding values, even in uncracked concrete, is attributable in the known fixing element to the bounding of the longitudinal slot towards the leading end of the fixing element by a stop face. As a consequence, on the one hand only a slight ascending angle for the base of the longitudinal slot can be achieved on the other hand the length of the expander member must also be considerably shortened relative to the length of the longitudinal slot in order to obtain a satisfactory displacement travel for the anchoring. If in addition further widening of the drilled hole occurs as a result of cracks forming, there is a risk that the expander member will bear against the leading stop face of the longitudinal groove and not offer any further expansion potential. This situation can also occur, for example, when the hole to be pre-drilled for the fixing element turns out to be somewhat larger than expected as the hole is being prepared.

Finally, the planar base of the longitudinal slot and planar bearing surface of the expander member provide a high contact pressure during the expansion process which can lead to cold welding. As a result, subsequent expansion and consequently suitability for use in the tensile zone are also impaired.

German patent document DE 33 34 754 C2 discloses an expansible plug, the plug body of which is of sleeve-shaped construction having an internal thread for a screw or threaded rod. The wedge-shaped expander member of this expansible plug is a part of the plug body and is joined to the plug body by way of a web remaining between incisions and acting as a desired rupture point. The incisions are arranged so that on the one hand an inclined face Sloping up towards the leading end of the plug body, and on the other hand the wedge shape of the expander element, are formed. In order to provide a surface for the application of an expansion tool, a stop member projecting into the sleeve bore of the plug body is integrally formed on the expander element.

In order to anchor the expansible plug, the expander member is first torn off at the desired rupture point using an expansion tool and then displaced towards the leading end of the plug body. The tearing off alone of the desired rupture point demands a pushing force that requires the known expansible plug to be braced at the bottom of the drilled hole. Moreover, to bridge the incisions separating the two sliding surfaces of the plug body and the expander element, a relatively large axial displacement of the expander element is required, in order to achieve an expansion effect. Since, furthermore, both the expander element and the plug body consist of the same material, there is a risk that during the expansion the two sliding surfaces will be damaged by cold welding and binding such that no subsequent expansion occurs. The known expansible plug is therefore unsuitable for use in the tensile zone in which drilled holes may widen as a result of cracks forming, requiring compensation through subsequent expansion.

SUMMARY OF THE INVENTION

Accordingly it is an object of the present invention to provide a fixing element which avoids the In keeping with these objects and with others which will become apparent hereinafter, one feature of the present invention resides, briefly stated, a fixing element having retaining means at the rear end for clamping an article to a building component and at least one expansion zone extending from the leading end in the longitudinal direction of a part of the length of the shank of the fixing element and formed by a longitudinal slot, wherein in accordance with the new inventive feature the longitudinal slot is formed by stamping and has a trapezoidal cross-section which two sliding surfaces arranged at an angle to one another and rising radially towards the leading end, and the expander member has two bearing surfaces resting on the sliding surfaces and provided on its external surface with teeth of roof-shaped construction which project at least with a part of their height beyond the shank.

When the fixing element is designed in accordance with the present invention, it can be driven in with little resistance, and can be anchored in a simple manner in a building component, and it has high holding values as a result of advantageous subsequent expansion behavior even when the drilled hole widens as a result of cracks forming.

The longitudinal slot having a trapezoidal cross-section and produced by stamping provides sliding surfaces arranged at an angle to one another, which at their surface have been compressed. The compression promotes the sliding behavior and thus reduces the tendency to cold welding and binding as the expander member is displaced in the longitudinal slot during the expansion process. A further reduction in the tendency to bind is achieved by the decrease in contact pressure by virtue of the fact that the two sliding surfaces are arranged at an angle to one another, which at the same time also take over lateral guidance of the expander member during displacement thereof.

By virtue of the teeth of roof-shaped construction which are arranged at the external surface of the expander element and project beyond the shank with part of their height, merely a groove is scored out in the prepared drilled hole as the fixing element is driven in. Since only the vertex of the toothed expander element digs into the wall of the drilled hole, the resistance that has to be overcome a the fixing element is driven in is low.

After driving in, the teeth arranged on the expander member hold it immovable in the drilled hole, whereas the shank is axially displaced with respect to the expander member during the anchoring process. The upwardly sloping longitudinal slot causes the expander member to be pressed radially outward into the wall of the drilled hole, the roof-shape of the teeth reducing the resistance of the external surface of the expander element to penetrating into the wall of the drilled hole. Only a low screwing-in torque is accordingly required for the anchoring. Since, moreover, the upwardly sloping base of the longitudinal slot runs out at a distance from the leading end at the outer circumference of the shank, firstly, a longer expander member having a larger pressure-applying area can be used and, secondly, because of the steeper ascending angle of the base a greater radial expansion can be achieved with smaller axial displacements.

It has proved especially advantageous, both for the sliding behavior and for the production of the longitudinal slot, for the two sliding surfaces to be arranged at an angle of 100°–120° to one another, and for the width of the basal area of the two sliding surfaces to be less than the width of the basal area of the two bearing surfaces of the expander member. The latter measure ensures that the expander member lie with its bearing, surfaces exclusively on the sliding surfaces.

A construction has proved advantageous in which the longitudinal slot, at its end facing towards the rear end of the fixing element, has at least a depth corresponding to half the diameter of the shank, and the ascending angle of the base lies between 11° and 13°.

In order to support the expander member as the fixing element is being driven in, a stop member of semicircular construction is provided at the limit of the longitudinal slot facing towards the rear end of the fixing element, against which the expander member bears at its deepest position.

Furthermore, a retaining element for example, a rubber ring, stamped bear or similar construction, can hold the expander member displaceably in the longitudinal slot before the fixing element is driven into the drilled hole, so that the expander member does not accidentally fall out of the longitudinal slot. A good locking action of the teeth combined with a low resistance to driving in is achieved by virtue of the fact that the teeth have disparate tooth flanks, the shorter tooth flank being arranged toward the leading end.

In order to facilitate driving in, in a further construction of the invention a ramp-like slope extending to the tip of the first tooth can be arranged at the leading end of the expander member.

In a further construction of the invention, the fixing element can have an internal thread at its rear end, so that by means of a screw, threaded rod or similar means an article can be fixed to the fixing element anchored in the masonry. The weight acting on the plug body creates a slight displacement between the plug body and the fixed expander member, and by virtue of the upwardly sloping base of the longitudinal slot this displacement results in the expansion being intensified. Because of the good sliding properties of the sliding surfaces an axial displacement occurs between the expander member and the plug body even when the drilled hole widens as a result of cracks forming.

In some cases, the displacement of the plug body with respect to the expander member is undesirable, since this would also produce a displacement of the screw or threaded rod. In order to avoid such a displacement, in a further advantageous construction provision is made for a bore which extends beyond the stop shoulder into the longitudinal slot and intersects this with a part of its cross-section to adjoin the internal thread, and for the expander member to be displaceable with the screw, threaded rod or a driving-in tool towards the leading end in order to anchor the fixing element.

Between the expander member and the screw or threaded rod to be screwed in, there may furthermore be arranged a resilient element, preferably a compression spring. Such resilient biasing of the expander member causes the expander member to be pushed up subsequently when the drilled hole widens as a result of cracks forming, so that no axial displacement of the plug body is required for the subsequent expansion. A rubber bolt can also be used as the resilient element.

The novel features which are considered as characteristic for the invention are set forth in particular in the appended claims. The invention itself, however, both as to is construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
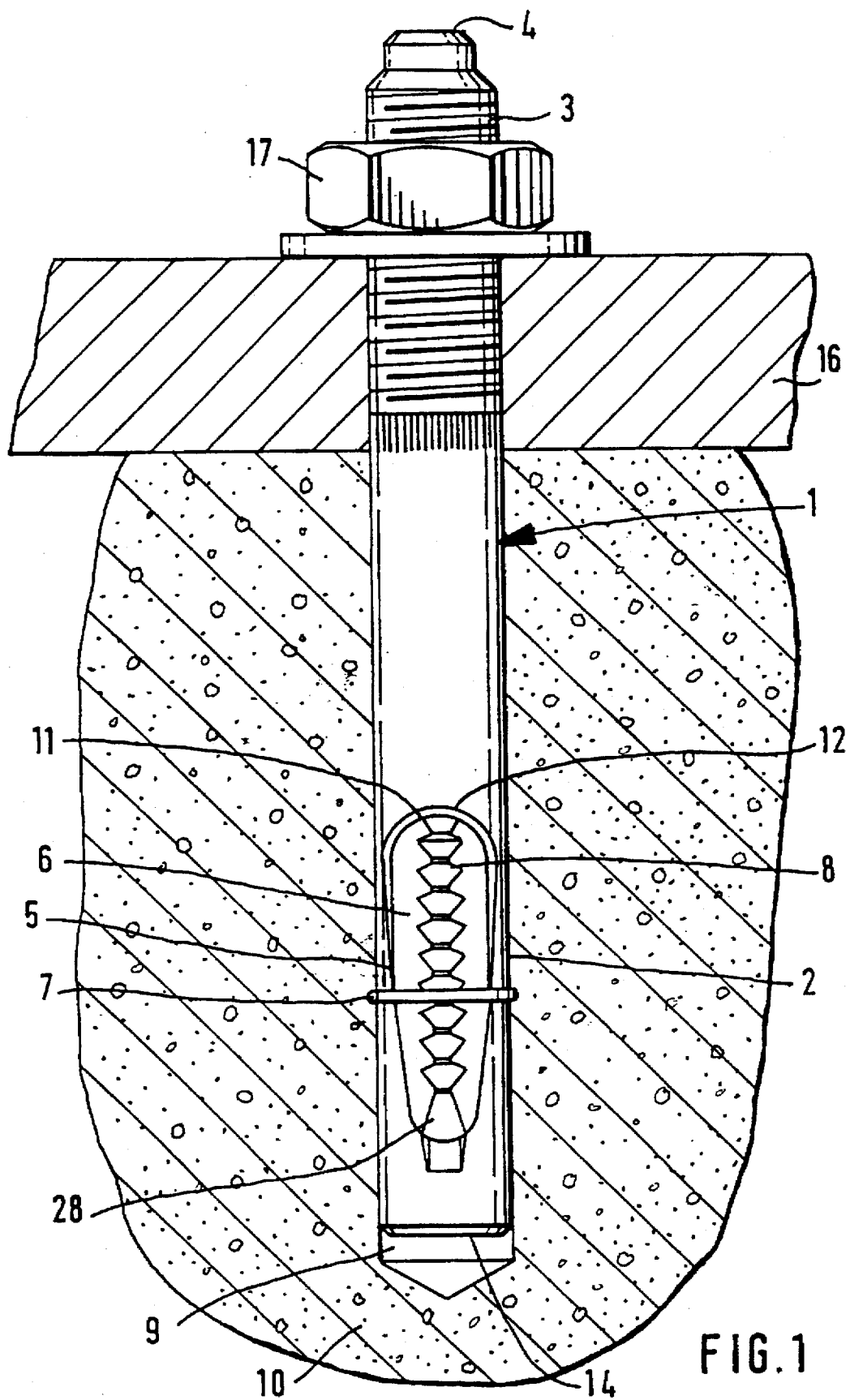
FIG. 1 Shows the fixing element, with an expander element lying in a longitudinal slot of its expansion zone, inserted in a hole drilled in a building component.

The fixing element 1 illustrated in FIG. 1 has a body with a shank 2 having an external thread 3 at its rear end 4 and an expansion zone which is formed by a longitudinal slot 5 of trapezoidal cross-section, and an expander member 6 lying in this longitudinal slot 5. The expander member 6, which is readily displaceable in the longitudinal slot 5, is held by a retaining element 7, in this particular embodiment a rubber ring.

Figure 3:
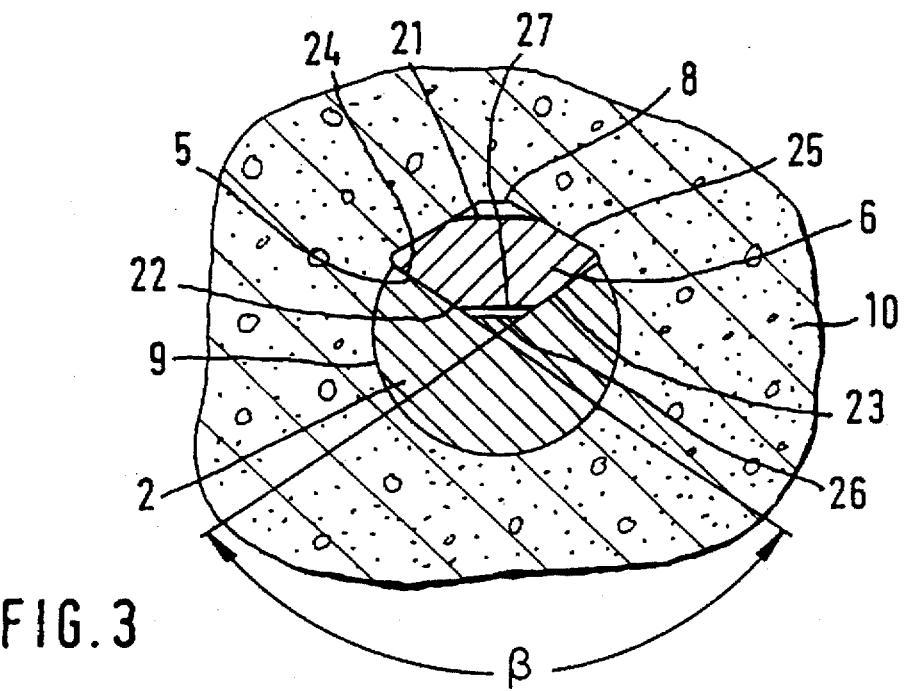
FIG. 3 is a cross-section of the fixing element according to FIG. 2 along the section line A—A.

On its external surface, the expander member 6 has teeth 8 of roof-shaped configuration in cross-section (see FIG. 3). As the fixing element 1 is driven into the hole 9 drilled in the building component 10, the expander member 6 is located in its deepest position, in which the rear semicircular end face 11 of the expander member 6 bears against the limit of the longitudinal slot 5, which is likewise semicircular and which serves as stop member 12. In that position, the teeth 8 project with part of their height beyond the shank 2 of the fixing element.

Figure 2:
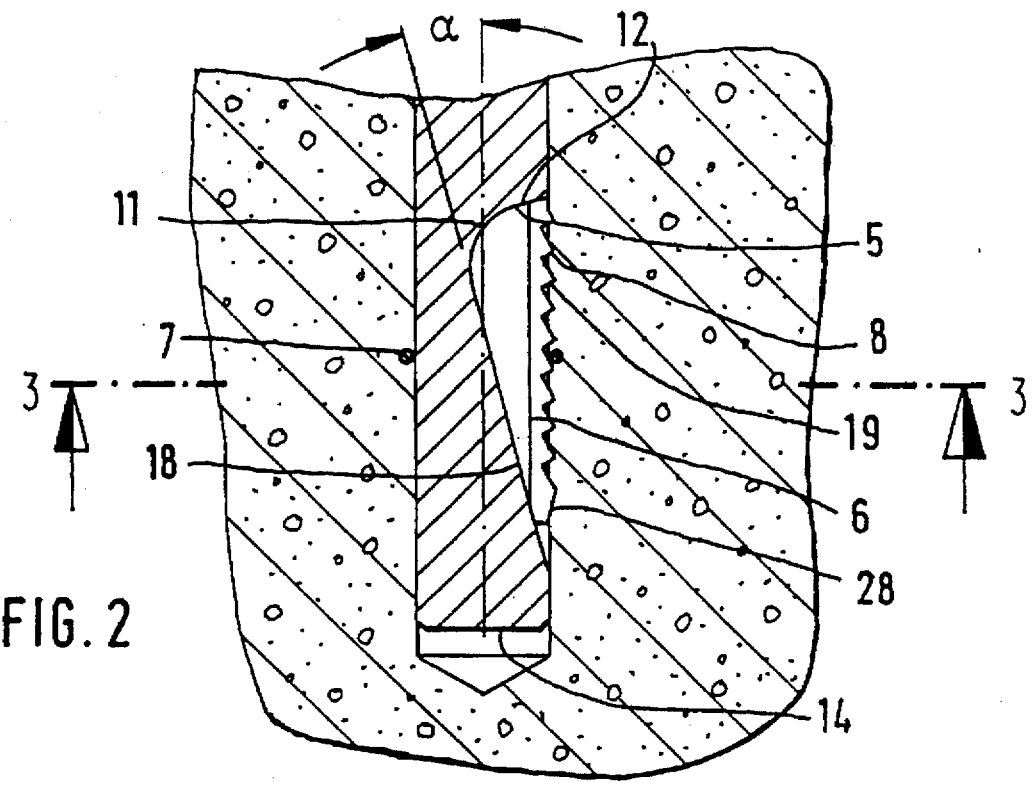
FIG. 2 is a partial longitudinal section of the fixing element of FIG. 1 in its anchored position.

The fixing element 1 is driven right through the article 16 to be fixed, into the drilled hole. By screwing the nut 17 onto the projecting threaded portion 3 the shank 2 is displaced axially with respect to the expander member 6 towards the mouth of the drilled hole, so that the expander member 6 is pressed radially outward by the upwardly sloping base 18 of the longitudinal slot 5 (see FIG. 2). As this happens, the teeth 8 of the expander member 6 dig into the wall of the drilled hole and effect anchoring of the fixing element. The teeth 8 have a saw-toothed profile, the tooth flank 19 sloping towards the leading end 14 to reduce the resistance to driving in. Furthermore, the expander member 6 has a ramp-like slope 28, which extends from the leading end of the expander member to the tip of the first tooth.

FIG. 3 shows a cross-section along the section line A—A drawn in FIG. 3. The roof-shaped construction of the tooth 8 favors deep penetration of the expander element 6 into the wall of the hole drilled in the building component 10. The trapezoidal cross-section of the longitudinal slot 6 is also recognizable in FIG. 3. The trapezoidal shape creates two sliding surfaces 22, 23 arranged at an angle to one another, on which the expander member 6 rests with its two bearing surfaces 24, 25. The angle β formed by the two sliding surfaces or bearing surfaces is preferably 100°–120°. In order to ensure that the bearing surfaces 24, 25 slide on the sliding surfaces 22, 23, the width of the basal area 26 between the two sliding surfaces is somewhat smaller than the width of the basal area 27 between the two bearing surfaces 24, 25 of the expander member 6.

Figure 4:
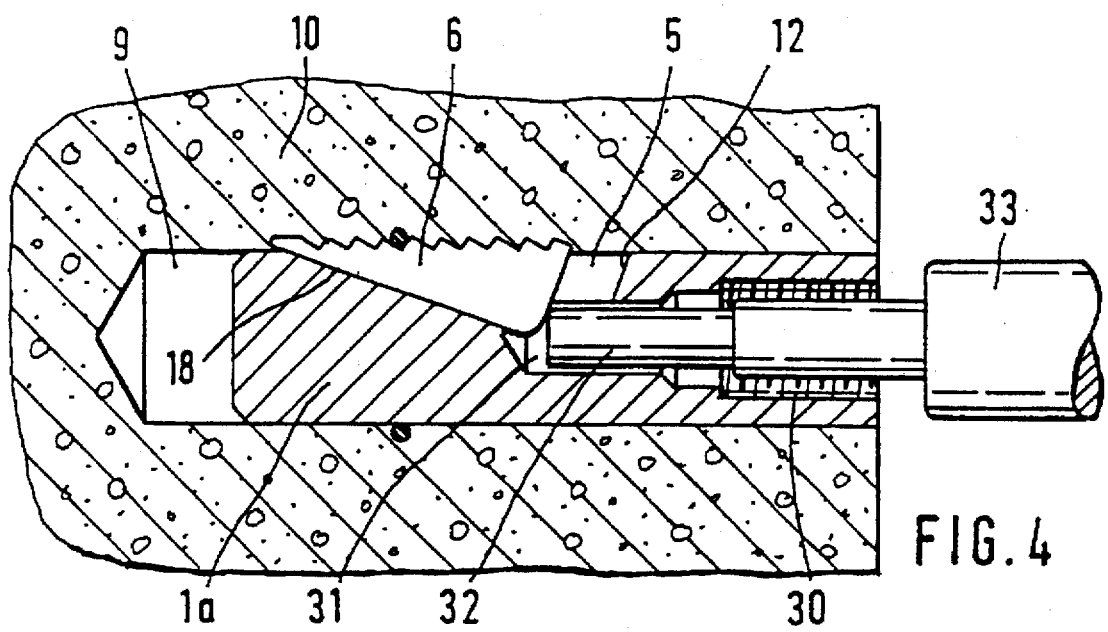
FIG. 4 is a longitudinal section of a fixing element having an internal thread shown during the anchoring process using a driving-in tool.

The fixing element 1a illustrated in FIG. 4 has at its rear end an internal thread 30 for receiving a screw or threaded rod. Adjoining the internal thread 30 there is a bore 31 of reduced diameter compared with the core diameter of the internal thread, which bore extends beyond the stop should 12 into the longitudinal slot 5 and intersects this with a part of its cross-section. The expander member 6 therefore projects with this rear end into the bore 31 so that the ram 32 of the driving-in tool 33 bears against the rear end of the expander member 6. Using the driving-in tool 33, the expander member 6 can now be displaced on the upwardly sloping base 18 of the longitudinal slot 5 towards the bottom of the drilled hole. The expander member 6 thus becomes Wedged in the hole 9 drilled in the building component 10 and affects anchoring of the fixing element. The axial displacement of the expander member 6 can also be effected directly with the screw or threaded rod to be screwed into the internal thread 30. In that case, either the internal thread 30 can be extended beyond the stop shoulder 12, or a reduced portion corresponding to the bore 31 can be arranged at the end face of the screw or threaded rod.

Figure 5:
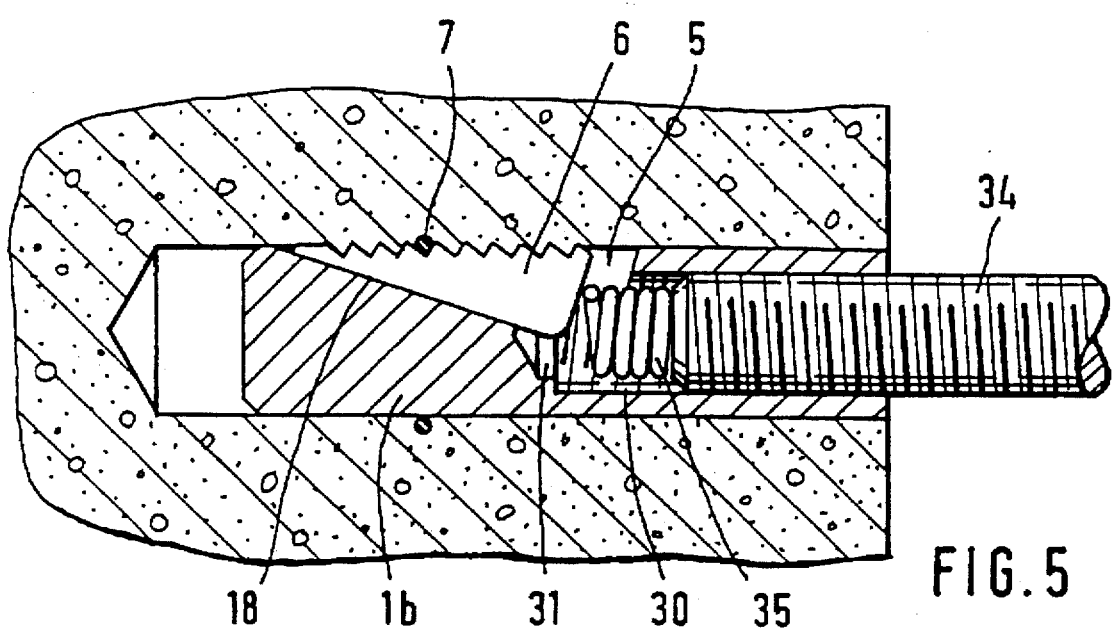
FIG. 5 shows the fixing element according to FIG. 4 with the threaded rod screwed in and a resilient element arranged between expander element and threaded rod.

In the illustration of FIG. 5, a threaded rod 34, for example, for suspending pipes, ceilings or similar structures, is screwed into the internal thread 30 of the fixing element 1b. A compression spring 35 is arranged as resilient element between the expander member 6 and the threaded rod 34. The compression spring 34 can either be pushed in after anchoring of the fixing element 1b by means of a driving-in tool and be clamped with the threaded rod 34, or can be used directly for axial displacement of the expander member 6 by means of the threaded rod 34. The compression spring exerts a steady pressure on the expander member 6 after a screw or the threaded rod has been screwed in so that on the one hand the expander member 6 is pushed up subsequently when the drilled hole widens as a result of cracks forming and on the other hand at the same time a safeguard against vibration of the threaded rod 34 is provided.

The expander member 6 can be manufactured either from malleable cast iron by pressure die casting, or by cold forming in a stamping and bending die. An expander member of malleable cast iron has very good sliding properties on account of the graphite content in the malleable cast iron.

It will be understood that each of the elements described above, or two or more together, may also find a useful application in other types of constructions differing from the types described above.

While the invention has been illustrated and described as embodied in a fixing element with an expander member, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fixing element, comprising a body having a rear end and a leading end, said body being provided with retaining means at said rear end and with at least one expansion zone starting from said leading end and extending in a longitudinal direction over a part of a length of said body, said expansion zone being formed by a longitudinal slot having a base sloping towards said leading end; and an expander member inserted in said longitudinal slot and displaceable in said longitudinal slot, said longitudinal slot being formed as a stamped slot and having a trapezoidal cross-section with two sliding surfaces arranged at an angle relative to one another and rising radially toward said leading end, said expander member having two bearing surfaces resting on said sliding surfaces and also having an external surface provided with teeth of roof-shaped construction which project at least with a part of a height of said teeth beyond said body.

2. A fixing element as defined in claim 1, wherein said sliding surfaces of said longitudinal slot are arranged at an angle of substantially 100°–120° relative to one another.

3. A fixing element as defined in claim 1, wherein said body has a base area between said two sliding surfaces, and said expander member has a base area between said two bearing surfaces, said base area between said two sliding surfaces of said body having a width which is smaller than a width of said base area between said two bearing surfaces of said expander member.

4. A fixing element as defined in claim 1, wherein said longitudinal slot has an end facing toward said rear end of said fixing element and having a depth corresponding to half the diameter of said body, said longitudinal slot having a base with an ascending angle lying between 11° and 13°.

5. A fixing element as defined in claim 1, wherein said longitudinal slot has a limit toward said rear end and provided with a stop shoulder, said expander member bearing against said stop shoulder.

6. A fixing element as defined in claim 5, wherein said stop shoulder is a semi-circular stop shoulder.

7. A fixing element as defined in claim 5, wherein said rear end of said body having an internal thread, said body having a bore which extends beyond said stop shoulder into said longitudinal slot and intersects said longitudinal slot with a part of a cross-section, said threaded rod adjoins said internal thread, said expander member being displaceable with an additional member toward said leading end in order to anchor the fixing element.

8. A fixing element as defined in claim 1; and further comprising a retaining element acting on said expander member, said retaining element holding said expander member displaceably in said longitudinal slot.

9. A fixing element as defined in claim 7, wherein said retaining element is formed as a rubber ring.

10. A fixing element as defined in claim 1, wherein said teeth have disparate tooth flanks with a shorter tooth flank being arranged so that it faces toward said leading end.

11. A fixing element as defined in claim 1; and further comprising a ramp-like slope extending to a tip of a first one of said teeth and arranged at said leading end of said expander member.

12. A fixing element as defined in claim 1, wherein said rear end of said body is provided with an internal thread.

13. A fixing element as defined in claim 12, wherein said member with which said expander member is displaceable is a member selected from the group consisting of screw, a threaded rod and a driving-in tool.

14. A fixing element as defined in claim 1, wherein said expander member is composed of malleable cast iron.

* * * * *